US005485325A

United States Patent [19]

Skow et al.

[11] Patent Number: 5,485,325
[45] Date of Patent: Jan. 16, 1996

[54] MAGAZINE STORAGE SYSTEM FOR RECORDING STRIPS

[75] Inventors: Lynn R. Skow, North Branch, Minn.; Arthur R. Moore, Deer Park, Wis.; James R. Gilbertson, Maplewood, Minn.

[73] Assignee: Minnesota Mining and Manufacturing Company, St. Paul, Minn.

[21] Appl. No.: 222,080

[22] Filed: Apr. 4, 1994

[51] Int. Cl.$^6$ .................... G11B 5/008; G11B 15/00
[52] U.S. Cl. .................................................. 360/91
[58] Field of Search ........................ 360/91, 95, 78.03; 355/318

[56] References Cited

U.S. PATENT DOCUMENTS

| | | |
|---|---|---|
| Re. 32,284 | 11/1986 | Stange et al. . |
| 2,612,566 | 9/1952 | Anderson et al. . |
| 2,816,757 | 12/1957 | Burkhart . |
| 2,905,768 | 9/1959 | Cronquist . |
| 2,913,536 | 11/1959 | Fuller et al. . |
| 3,096,882 | 7/1963 | Tyler . |
| 3,103,850 | 9/1963 | Khoury et al. . |
| 3,106,355 | 10/1963 | Warren . |
| 3,127,120 | 3/1964 | Selsted et al. . |
| 3,134,527 | 5/1964 | Willis . |
| 3,176,279 | 3/1965 | Lin et al. ........................ 360/95 |
| 3,180,688 | 4/1965 | Futer . |
| 3,198,515 | 8/1965 | Pitney . |
| 3,231,165 | 1/1966 | Wallin et al. . |
| 3,242,371 | 9/1967 | Wilmer . |
| 3,270,933 | 9/1966 | Dekker . |
| 3,347,437 | 10/1967 | Rush . |
| 3,405,977 | 10/1968 | Albright . |
| 3,406,382 | 10/1968 | Wilmer . |
| 3,418,434 | 12/1968 | Groenewegen . |
| 3,428,524 | 2/1969 | Wilcox et al. . |
| 3,472,971 | 10/1969 | Van Den Berg . |
| 3,518,649 | 6/1970 | Gabor ........................... 340/174.1 |
| 3,546,685 | 12/1970 | Gabor ........................... 340/174.1 |
| 3,548,783 | 12/1970 | Knapp ............................ 118/224 |
| 3,576,282 | 4/1971 | Epina, Jr. et al. . |
| 3,614,168 | 10/1971 | Range . |
| 3,620,430 | 11/1971 | Baumann et al. . |
| 3,623,775 | 11/1971 | Arseneault . |
| 3,645,581 | 2/1972 | Lasch, Jr. et al. . |
| 3,653,568 | 4/1972 | Cronquist . |
| 3,678,216 | 7/1972 | Rousso, Jr. et al. . |
| 3,705,413 | 12/1972 | Cronquist . |
| 3,708,136 | 1/1973 | Cope et al. . |
| 3,718,371 | 2/1973 | Lasch, Jr. . |
| 3,796,393 | 3/1974 | Beistle . |
| 3,912,144 | 10/1975 | Arseneault et al. . |
| 3,918,706 | 11/1975 | Craft . |

(List continued on next page.)

FOREIGN PATENT DOCUMENTS

| | | |
|---|---|---|
| 615924 | 3/1961 | Canada . |
| 1499984 | 2/1970 | Germany . |
| 1190063 | 4/1970 | United Kingdom . |
| 1216123 | 12/1970 | United Kingdom . |
| 1288686 | 9/1972 | United Kingdom . |

OTHER PUBLICATIONS

May and Swearingen, "Random Access Tape File", IBM Technical Disclosure Business vol. 9, No. 12, May 1967, pp. 1717–1718.

"Self-Centering Lift Transport," *IBM Technical Disclosure Bulletin*, Apgar et al., vol. 18, No. 7. Dec. 1975, pp. 2141–2142.

*Primary Examiner*—John H. Wolff
*Assistant Examiner*—Adriana Giordana
*Attorney, Agent, or Firm*—Gary L. Griswold; Walter N. Kirn; Eric D. Levinson

[57] ABSTRACT

A magazine storage system for storing and retrieving recording strips. The system includes a magazine, having shelves for storing the strips, and a loop-shaped drive. The strips are transported between the magazine and the drive by conduits having air jets emanating from holes therein. The system provides rapid access to large amounts of stored information.

19 Claims, 7 Drawing Sheets

U.S. PATENT DOCUMENTS

| | | |
|---|---|---|
| 4,003,568 | 1/1977 | Stange et al. . |
| 4,015,880 | 4/1977 | Colvin et al. . |
| 4,055,340 | 10/1977 | Stange et al. . |
| 4,059,260 | 11/1977 | Stange et al. . |
| 4,081,201 | 3/1978 | Hassan et al. . |
| 4,144,618 | 3/1979 | Campo et al. . |
| 4,299,518 | 11/1981 | Whelan . |
| 4,337,885 | 7/1982 | Stahler . |
| 4,395,165 | 7/1983 | DeRobertis et al. . |
| 4,406,425 | 9/1983 | Bullock et al. . |
| 4,411,503 | 10/1983 | Bailey et al. . |
| 4,487,506 | 12/1984 | Repp et al. ............................ 355/14 |
| 4,493,548 | 1/1985 | Ateya . |
| 4,525,757 | 6/1985 | Imanishi et al. . |
| 4,568,223 | 2/1986 | Lenhart . |
| 4,749,146 | 6/1988 | Bridger et al. . |
| 4,842,177 | 6/1989 | Callender et al. . |
| 4,858,808 | 8/1989 | Bingaman et al. . |
| 4,919,319 | 4/1990 | Ford et al. . |
| 5,102,118 | 4/1992 | Vits . |
| 5,135,149 | 8/1992 | Van Den Dungen . |
| 5,203,485 | 4/1993 | Cahill et al. . |
| 5,219,129 | 6/1993 | Spicer et al. ............................ 360/95 |
| 5,224,641 | 7/1993 | Spicer . |
| 5,280,465 | 1/1994 | Dunbar et al. . |
| 5,293,285 | 3/1994 | Leonhardt et al. ...................... 360/95 |

MAGAZINE STORAGE SYSTEM FOR RECORDING STRIPS

FIELD OF THE INVENTION

The present invention relates generally to information storage systems and, more particularly, to information storage systems which employ pneumatic means for transporting and storing recording strips.

BACKGROUND OF THE INVENTION

Devices which record magnetic or optical signals on magnetic or optical tape are known. Typically, these devices accept tape which is stored on an open reel or in a cassette and cause the media to be drawn past a transducer, which is fixed or moving, to allow signals to be read or written on selected regions of the tape. Because relatively long lengths of tape are used for recording significant amounts of information, the tape is typically stored on reels and the tape drawn past the transducer by a capstan or some other mechanical means. Pulling on the tape puts tension on the media which may cause it to wear, distort or even break in extreme cases such as a malfunction of the device. In addition, the inertia of the mass of tape stored on the reels results in relatively slow acceleration and deceleration of the tape packs on the reels. Rapid acceleration and deceleration also place significant stress on the tape. The amount of time required to accelerate and decelerate the tape packs limits the access time with which information can be encoded on the tape or read back from the tape by the drive system and transducer.

As the need for capturing more information in smaller spaces grows, the tape may be made thinner so that more tape surface can be stored in a given volume of storage space, such as a cartridge or cassette. Thus, tapes having a thickness of 25 µm or less are common, and 13 µm thick tape is often used. The fragile nature of such tape makes rapid access to random regions of the tape difficult because of the stress that is placed on the tape during rapid acceleration and deceleration of the tape packs.

U.S. Pat. No. 3,653,568 (Cronquist I) discloses a pneumatic system for moving an elongated strip of flexible tape around a loop-shaped conduit. The tape is moved through a continuous and substantially enclosed passageway or tunnel within the conduit that has dimensions slightly greater than the tape moving therethrough. The tape is transported through the tunnel by an air flow which enters the tunnel from both sides of the tape at four locations spaced around the loop. The air flow is exhausted through four pairs of apertures spaced around the loop.

The pneumatic system disclosed in Cronquist I has several disadvantages. First, because only four pairs of output nozzles are provided, the tape is not uniformly supported within the tunnel. As a result of this non-uniform support, the tape will tend to contact the inner surface of the tunnel as it moves around the loop, resulting in wear or damage of the tape. The tact that the tunnel is enclosed, resulting in the need to provide exhaust openings within the tunnel, may also contribute to the non-uniform support of the tape. Second, because the air flow is directed at the tape from both sides of the tape, the air flow from above and below the tape must be symmetrical. All of the nozzles would probably have to be carefully tuned or calibrated to provide the appropriate air flow pattern within the tunnel. The nozzles might also have to be re-calibrated for different lengths of tape. Third, the duct design is fairly complex.

U.S. Pat. No. 3,705,413 (Cronquist II) discloses a data processing system for storing a large number of tape strips. The strips are provided in a closed passageway having slits at either end leading to a complex strip diverter mechanism. The strips are blown through the system in a relatively uncontrolled fashion. As a result, the strips can be expected to contact the walls of the passageways, thereby limiting the speed of the strips (thus limiting access time), and wearing or otherwise damaging the surface of the strips, thereby destroying data encoded in the strips.

SUMMARY OF THE INVENTION

The present invention recites an improved magazine storage system for recording strips. The system includes a magazine, having shelves for storing recording strips, and a loop-shaped drive for transporting the strips past a transducer in the drive. The strips are transported from the shelves to the drive over a non-enclosed surface via air jets which emanate from holes in the surface provided on both sides of the longitudinal centerline of the surface in the direction of travel of the strips. The strips are read/written by the transducer in the drive. The strips are then returned by more air jets to the appropriate shelf for storage.

In one embodiment, the system includes a mechanism, such as a cusp, for accessing a particular strip in the magazine. In another embodiment, the system includes two or more magazines, thereby increasing the storage capacity of the system. A single drive may be used with two or more magazines by using one or more shifters which can laterally shift recording strips from different magazines into the drive.

A second drive may be added to the system either to read/write on the opposite side of the strip as the first drive, thereby doubling the storage capacity of the system, or to allow two strips to be read/written simultaneously, thereby increasing the data transfer rate of the system. The magazine may be removable, or it may be made up of several submagazines, each of which is removable.

The present invention also includes a magazine storage system for reading/writing both sides of a recording strip. The system includes two loop-shaped drives, a magazine, a conduit, and means for manipulating the strip so that each drive can read/write an opposite side of the strip. The strip may be transported in the same direction in both drives, e.g., clockwise, or in opposite directions. The system may include a third loop for accelerating the strip to reading/writing speed. The manipulating means may include means for transporting the strip into a reversing bin, stopping the strip, reversing its direction of travel, exiting the reversing bin, and replacing it on the conduit, thereby switching the side of the strip that faces the conduit.

The present invention also includes a method of storing and retrieving information. The method includes the steps of supporting and transporting recording strips between the magazine and the drive by air jets, as described above.

As used herein, the term "transducer" means anything that is capable of sensing or modifying the properties of a flexible strip, including, for example, a magnetic or optical read/write head. The term "read/write" means read and/or write. The term "recording strip" means any strip that is capable of storing information. The terms "proximate" and "close proximity" mean close enough to allow a transducer to read/write on a recording strip.

DETAILED DESCRIPTION

Figure 1:
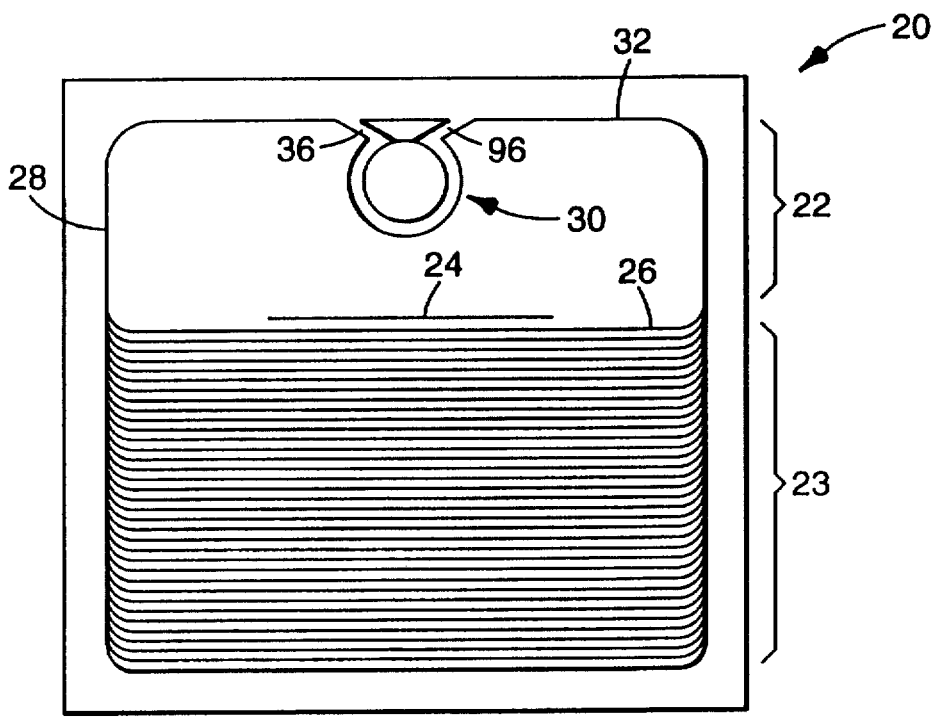
FIG. 1 is a schematic side view of a mass storage system according to one embodiment of the present invention.

A mass storage system 20 according to one embodiment of the present invention is shown schematically in FIG. 1. System 20 is comprised of reading/writing deck 22 and magazine storage 23, which may be removable or non-removable.

Reading/writing deck 22 includes a loop-shaped drive 30, which will be described later in more detail with reference to FIG. 4. Returning to FIG. 1, magazine storage 23 includes a plurality of shelves 26 which are capable of storing a plurality of recording strips 24.

Briefly, system 20 works as follows. A recording strip 24 is pneumatically transported off of a shelf 26 and onto working surface 28. (The pneumatic transport mechanism will be discussed later in more detail with reference to FIGS. 2 and 3.) Strip 24 is then transported along working surface 28 and into loop drive 30 where it may be written upon or read by the drive (as discussed later with reference to FIG. 4). After being pneumatically transported around drive 30, strip 24 exits the drive and is transported along working surface 32 until it is returned to the appropriate shelf 26.

Figure 2:
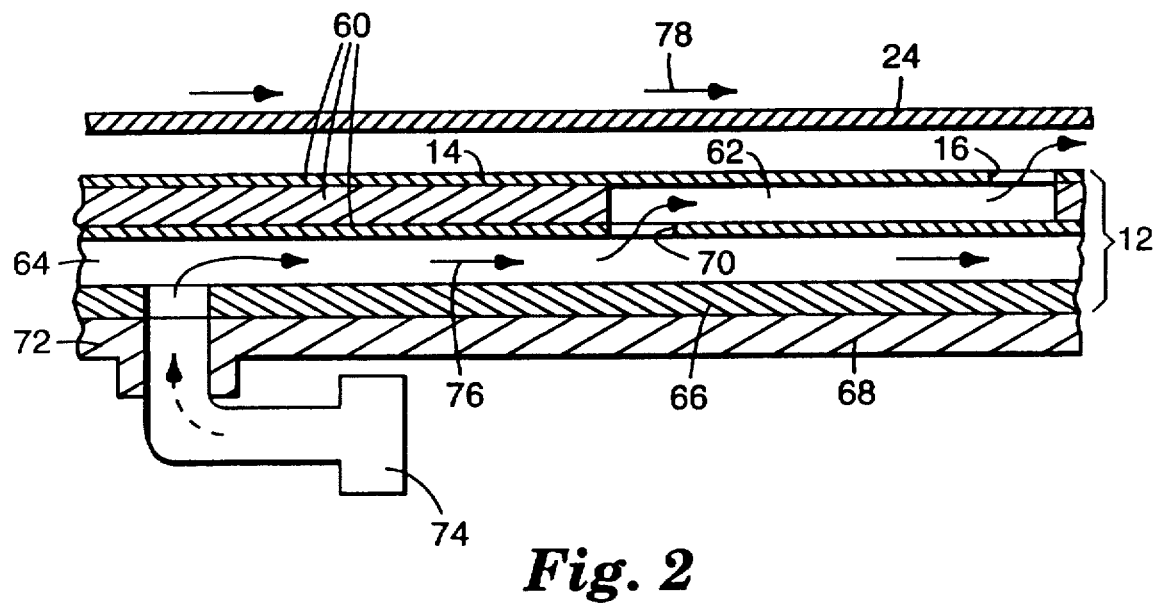
FIG. 2 is a schematic cross-sectional view of a conduit for transporting a recording strip within a mass storage system according to the present invention.

A schematic cross-sectional view of the conduit underlying a working surface, such as working surface 28 or 32 is shown as conduit 12 in FIG. 2.

As shown in FIG. 2, conduit 12 comprises working surface 14, layers 60, plenum chamber 62, supply manifold 64, and bottom surface 66. Plenum chamber 62 communicates with supply manifold 64 via inlet 70 and working surface 14 via orifices 16. Conduit 12 may be provided on a support 68. A fluid source 74, such as a compressor or fan, supplies pressurized fluid to supply manifold 64 via an inlet 72 through bottom surface 66 and optional support 68. The direction of the fluid flow within conduit 12 is shown by arrows 76. The pressurized fluid exits through orifices 16 in a jet-like flow against strip 24, thereby supporting the strip and causing it to move along working surface 14 in the direction of arrows 78.

Conduit 12 can include three layers 60 which form a web of flexible material which is supported by support 68, which can be rigid. Fluid enters the first layer 60 from supply manifold 64 via inlet 70. Plenum chamber 62 in the second layer 60 establishes the direction of the fluid flow. The fluid exits via orifice 16 in the third layer 60. Layers 60 can be as thin as, for example, about 0.01 mm and can be any flexible material. Layers 60 can be joined or laminated by bonding, welding, or using adhesives. In the alternative, layers 60 can simply be pressed together without bonding. Layers 60 can be pre-coated with an adhesive on the outermost bottom layer and conduit 12 can be attached like adhesive tape to a mounting surface which has ports to communicate with those in the bottom of conduit 12. A release layer, such as silicone treated paper, may optionally be included to facilitate storage and unwinding of the article.

Layers 60 can be formed of plastics, metals, ceramics, or composite materials. To prevent static charge build-up on working surface 14, the working surface can be metallic or conductive plastic. The openings in each layer 60 can be formed by any known method including etching, punching, drilling, stamping, molding, casting, or laser cutting. The openings can be perpendicular to or at acute angles with the surface of the layer. Also, plenum chamber 62 formed when layers 60 are stacked need not be straight or linear and can have any desired shape.

In the alternative, the three layers 60 can be replaced by two layers or a single layer having a plurality of holes provided therethrough which allow supply manifold 64 to communicate with working surface 14. The holes may be provided by a drill, for example, and should be oriented to roughly approximate the angle provided by the fluid path shown in FIG. 2 from inlet 70 to orifice 16. The single layer can be rigid or flexible.

Figure 3:
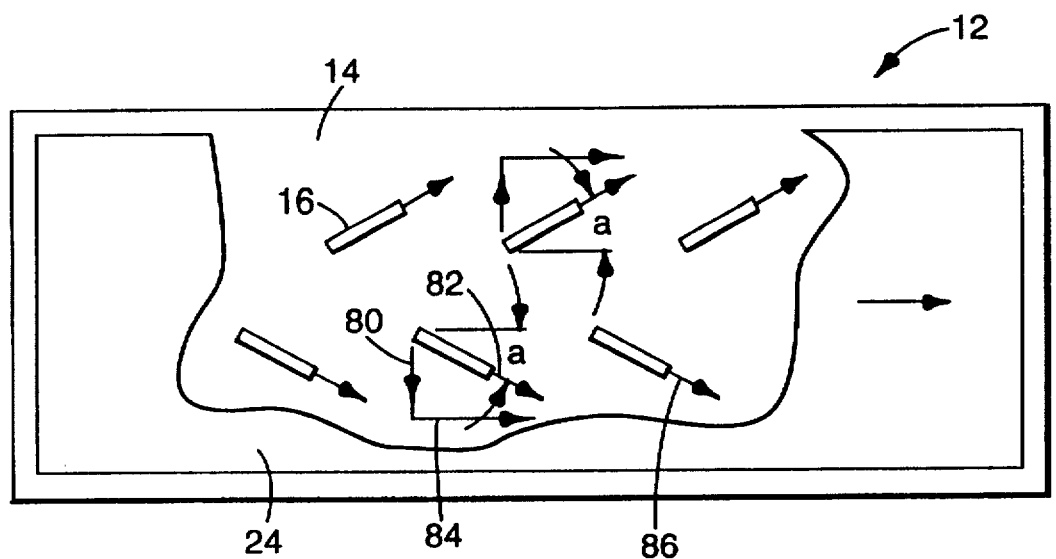
FIG. 3 is a schematic top view of the conduit shown in FIG. 2.

As shown in FIG. 3, orifices 16 are provided on opposite sides of the longitudinal centerline of working surface 14 along the direction of travel of strip 24. Fluid passes through orifices 16 in working surface 14 in the direction of arrows 86, thereby supporting and transporting strip 24. The operation of system 20 can be varied by changing the pattern, direction, angle, shape, and length of orifices 16, the thickness of layers 60, the fluid pressure, and the physical properties of strip 24. The operation of the system can also be altered by changing the angle a, shown in FIG. 3, at which the fluid exits orifices 16. Directional component 84 of the fluid stream both supports and transports strip 24 while cross-directional component 80, perpendicular to directional component 84, contributes only to the support of the strip. Cross-directional component 80 and directional component 84 combine to yield flow direction 82. When the fluid exits with no cross-directional component 80, conduit 12 transports strip 24 with less support than if there were a cross-directional component. When the fluid exits with some cross-directional component, conduit 12 transports strip 24 with increased support. When the fluid exits with no directional component 84, conduit 12 holds strip 24 with no transport.

The fluid stream exiting plenum chamber 62 via orifices 16 creates a controllable gap between working surface 14 of conduit 12 and strip 24. The gap is established by balancing and maintaining equilibrium among the forces, including gravity, on strip 24. Conduit 12 can operate to transport strip 24 regardless of whether working surface 14 is in a horizontal or vertical orientation, or at any orientation along the 360° circle of positions.

The use of directed fluid streams to support and carry recording strip 24 provides a distributed motive force on the strip, rather than a localized pulling force, so that the strip is manipulated without substantial lengthwise or down-web tension on the strip. Because strip 24 flies over a cushion of fluid, acceleration and deceleration can occur rapidly without producing significant tension on the strip.

It has been found that a relatively stable separation between the strip and the working surface is possible with the configurations described herein. The strip can be prevented from touching the working surface while still being held closely thereto as the strip follows a straight or curved path.

The fluid streams shown in FIGS. 2 and 3 provide a pneumatically induced tension across the width of strip 24, thereby minimizing the flutter and vibration of the strip. The fluid streams also provide for exhaust of the fluid from the open working surface without the need for special grooves or other exhaust structures. Thus, the working surface is preferably non-enclosed, in contrast to the enclosed passageways taught in Cronquist I and II. System 20 is also advantageous because it avoids the use of tape guide pins or capstans, which are major contributors to wear on recording tape by the recording system.

Figure 4:
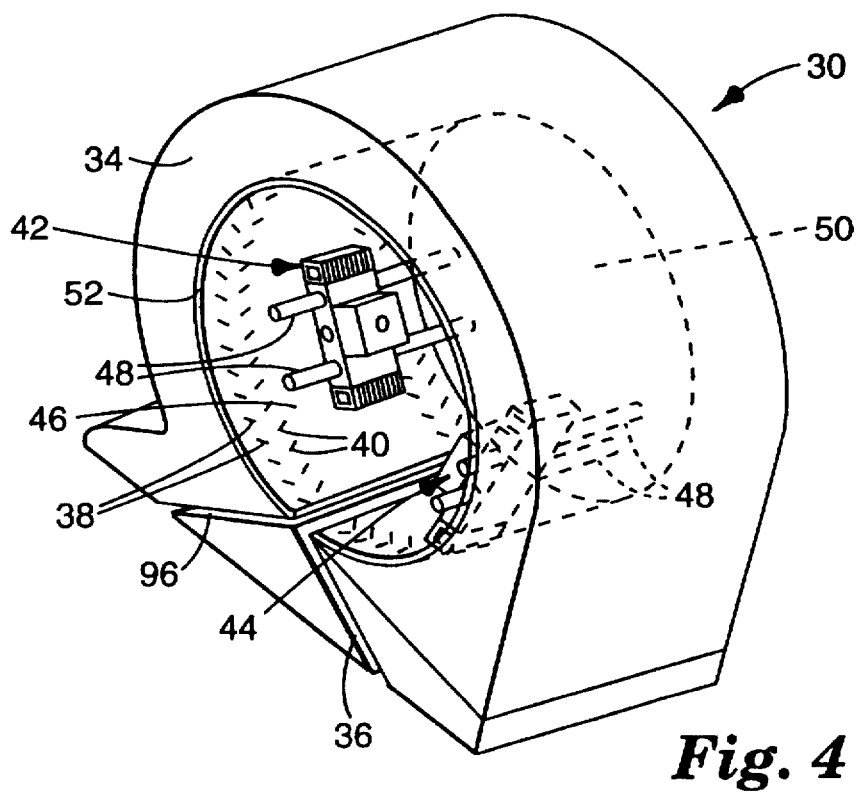
FIG. 4 is a schematic perspective view of a loop-shaped drive for use in a mass storage system according to the present invention.

Loop-shaped drive 30 is shown in FIG. 4. Drive 30 includes loop-shaped conduit 34 which has a working surface 46 on its inner periphery which supports and transports strip 24 as it travels within the drive.

Working surface 46 contains orifices 38 and optional orifices 40 for expelling fluid from the manifold (not shown) contained within the interior of loop-shaped conduit 34 to transport strip 24 around the interior of the loop. As with conduit 12, the downstream edges of orifices 38 and 40 are shown angled outwardly relative to the direction of travel of strip 24. Thus, orifices 38 are activated to cause strip 24 to travel in a clockwise direction and optional orifices 40 are activated to cause the strip to travel in a counter-clockwise direction, as viewed in FIG. 4.

A first transducer 42 is attached to side wall 50 of drive 30 by guide/support members 48. Various mechanisms can be employed to allow transducer 42 to move across the width of working surface 46 in close proximity to strip 24 when it enters drive 30 so that all information tracks on strip 24 can be accessed by the transducer. The transfer of information between transducer 42 and strip 24 may be interrupted by the leading or trailing edge of the strip. Thus, a second transducer 44 may optionally be included as shown in FIG. 4. Second transducer 44 can be aligned with reference to first transducer 42 to provide for the continuous transfer of information between the transducers and recording strip 24 when read/writing on an information track on the strip.

Optional side wall 50 and edge guide 52 serve to keep strip 24 from straying off working surface 46. Although the illustrated embodiments included herein are described as using air, system 20 can operate with various other fluids such as water, inert fluorocarbons, and various other gases and gas mixtures.

Entry into and exit from drive 30 are provided by slots 36 and 96. Slots 36 and 96 allow strip 24 to be moved in one slot and out the other without ever having to change the direction of travel of the strip around the inner periphery of loop-shaped conduit 34. Thus, a second conduit could be brought into position in one slot while strip 24 exits the loop via the other slot, so that the second strip could be inserted into the loop immediately after the first strip exits the loop.

System 20 operates as follows. Recording strip 24 is positioned on a shelf 26 which is equipped with a working surface resembling the working surfaces described above. Fluid streams originating from orifices (such as orifices 16) are then activated to transport strip 24 toward working surface 28. Fluid streams originating from orifices in working surface 28 are then activated to transport strip 24 toward drive 30 via entrance slot 36. Fluid streams originating from orifices in working surface 36 of drive 30 transport strip 24 around the inner periphery of loop-shaped conduit 34.

The rate at which information is transferred between strip 24 and loop-shaped drive 30 depends, among other things, on the speed with which the strip moves with respect to the transducers and the number of such transducers provided. The rotational speed of strip 24 in the loop can be as high as 4,500 rev/min or more. Although two transducers 42 and 44 are shown in FIG. 4, additional transducers may be provided to increase the rate at which information is transferred between strip 24 and loop drive 30.

Strip 24 is transported around the interior of loop-shaped conduit 34 as many times as necessary to allow transducer guide/support members 48 to manipulate transducers 42 and 44 across the width of the strip to read/write all of the information tracks on the strip. For example, if there were 200 information tracks on strip 24, 100 revolutions would be required to allow the two transducers to cover all of the tracks, assuming one read/write channels per transducer. If the number of transducers were doubled, the number of revolutions required, and thus the amount of time required, could be halved. Similarly, the number of read/write channels per transducer could be increased, thereby decreasing the number of revolutions required.

Once the desired information has been transferred between strip 24 and loop drive 30, the strip is exited from the drive via slot 96. Fluid streams originating from orifices in working surface 32 are then activated to transport strip 24 back into an appropriate shelf 26 for storage.

Figure 5:
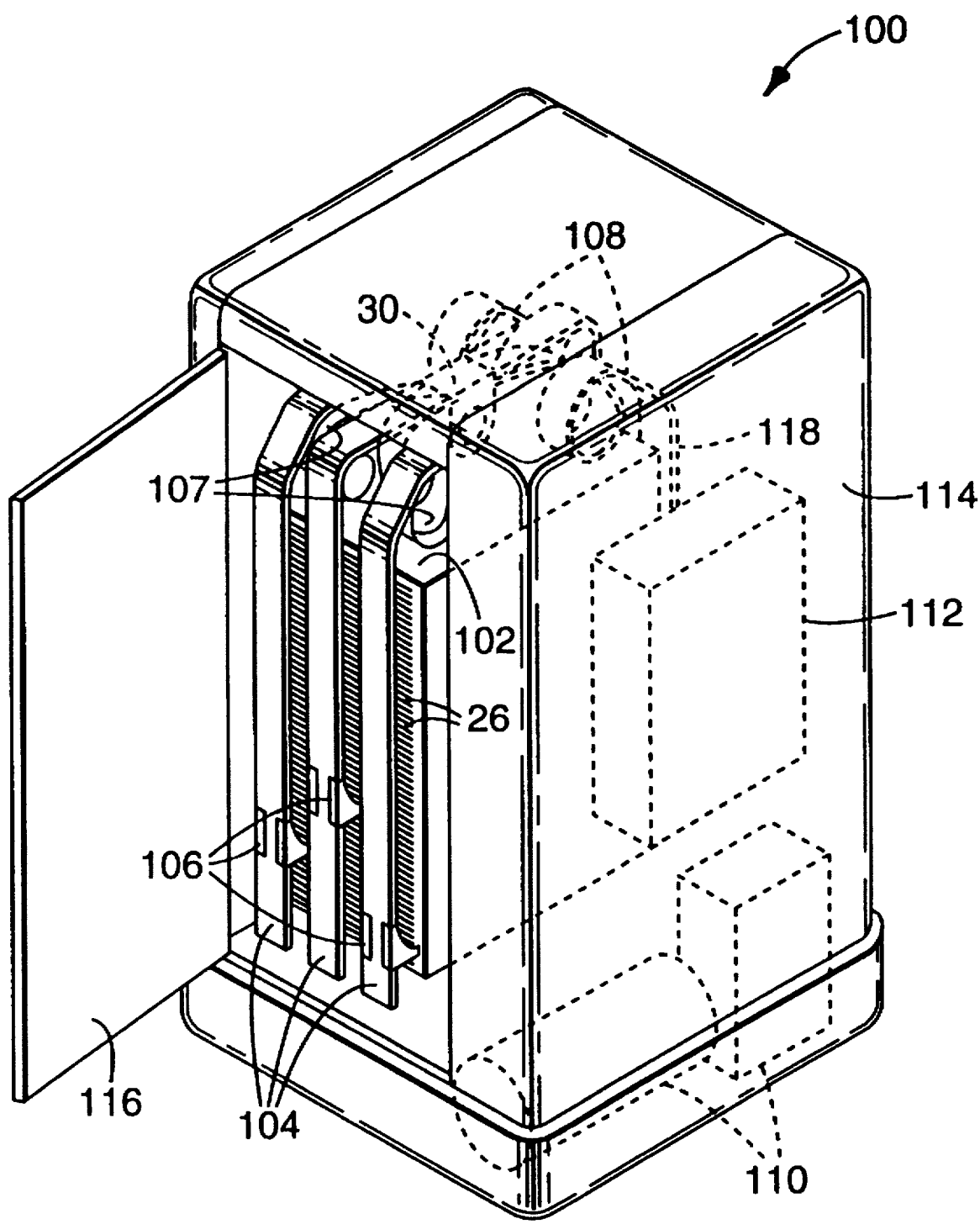
FIG. 5 is a schematic perspective view of a mass storage system according to an alternative embodiment of the present invention.

Another embodiment of a mass storage system according to the present invention is shown as mass storage system 100 in FIG. 5. System 100 is comprised of loop-shaped drive 30, three magazines 102, three entry conduits 104, three cusps 106, two entrance shifters 107, two exit shifters 108, three exit conduits 118, air tank and compressor 110, and control electronics 112, all of which are contained within housing 114 having door 116.

System 100 operates as follows. When a particular recording strip 24 within one of the magazines 102 is to be accessed, control electronics 112 determines which magazine the strip is stored in and moves the appropriate cusp 106 along the length of the appropriate entry conduit 104 to align the cusp with the appropriate shelf 26. Cusp 106 may be moved by a belt-mechanism or by other known means. Control electronics 112 then activates fluid streams originating from the appropriate shelf 26 and from the working surface on entry conduit 104 to transport strip 24 via cusp 106 toward drive 30.

If strip 24 was originally positioned in the middle magazine 102, the strip proceeds directly to loop-shaped drive 30. If, however, strip 24 was originally positioned in one of the side magazines 102, the strip is shifted laterally by corkscrew-shaped entrance shifter 107 to bring the strip into alignment with drive 30.

Strip 24 then enters drive 30 and is transported around its inner periphery as discussed earlier. Strip 24 then exits drive 30, is then shifted by corkscrew-shaped exit shifter 108, if necessary, and is transported via a working surface in the appropriate exit conduit 118 to return the strip to the shelf 26 from whence it came (if that is desired).

The use of three separate magazines 104 in a single system 100 allows for a three-fold increase in storage capacity over system 20. The use of entry conduits 104 allows system 100 to rapidly access three different recording strips 24, thereby decreasing access time. The use of entry shifters 107 and exit shifters 108 allows each strip 24 to be moved continuously in one direction from its original shelf 26, through drive 30, and back to its shelf, thereby decreasing access time. It should be noted, however, that the access time of system 100 is limited by the fact that there is only a single drive 30. This problem can be alleviated by adding additional drives 30 to system 100.

Figure 6:
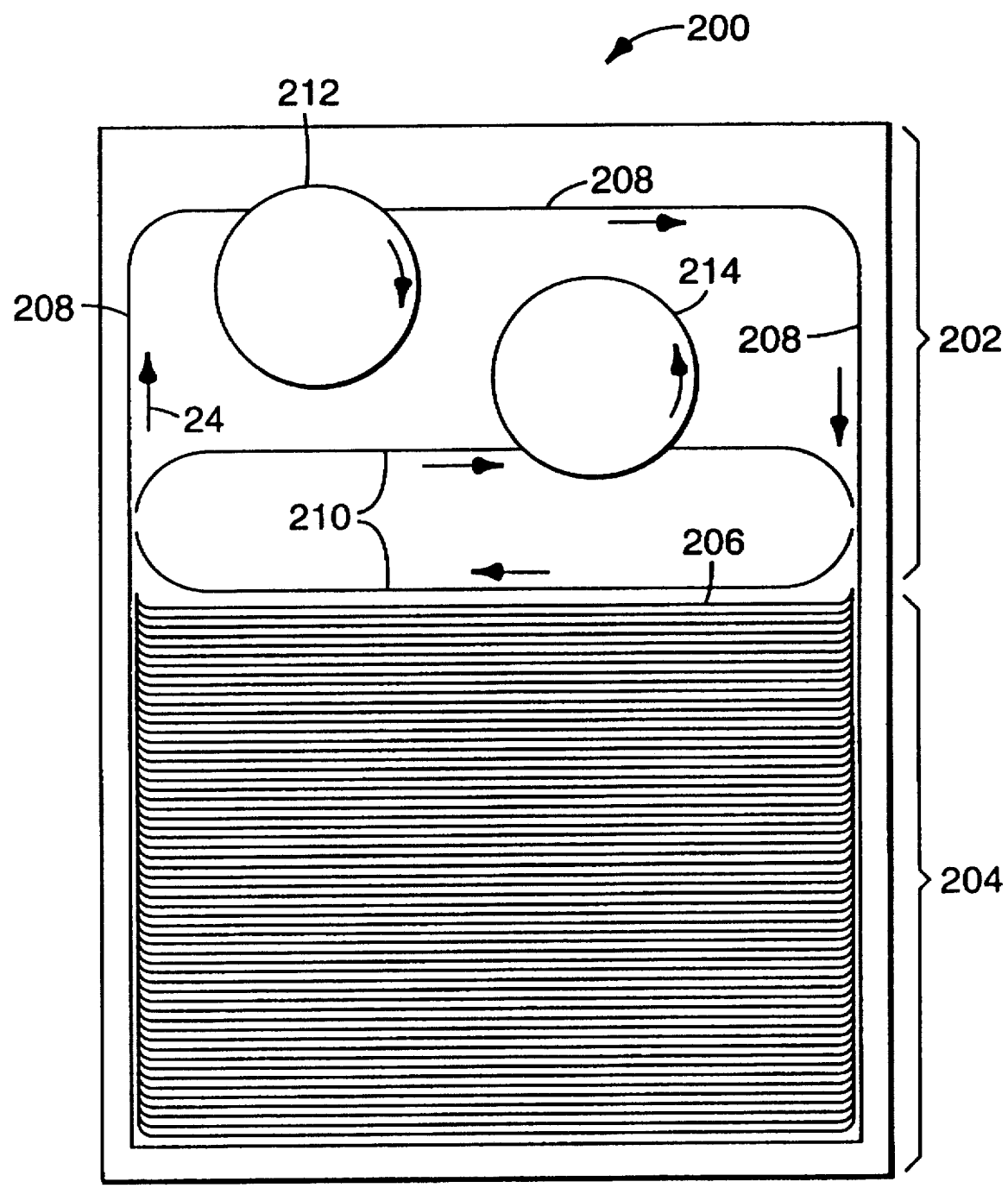
FIGS. 6–8 are schematic side views of mass storage systems according to alternative embodiments of the present invention.

Another embodiment of a mass storage system according to the present invention is shown in FIG. 6. System 200 is comprised of recording deck 202 having first and second loop drives 212 and 214 and magazine 204 having a plurality of shelves 206. A recording strip 24 is transported out of a shelf 206 and along first circuitous path 208 by jet streams emanating from orifices in the working surface thereof. Strip 24 is then transported into first loop drive 212, where it is transported in a clockwise direction (as viewed in FIG. 6) around the periphery of the loop as many times as necessary to read/write on the strip. Strip 24 is then exited from first loop drive 212 and continues along first circuitous path 208 toward either magazine 204 (if the strip is to be returned to the magazine for storage) or toward second circuitous path 210 (if reading/writing on the back side of the strip is desired). In the latter case, strip 24 is shifted by air knives or other mechanical devices (not shown) from the working surface of first circuitous path 208 to the working surface of second circuitous path 210, where it is transported in clockwise fashion (as viewed in FIG. 6) toward second loop drive 214.

Strip 24 then enters second loop drive 214 where it is transported in a counter-clockwise direction (as viewed in FIG. 6) around the periphery of the hoop as many times as necessary to read/write on the strip.

An inspection of the path traveled by strip 24 from first loop drive 212 to second loop drive 214 reveals that the major surface of the strip facing the periphery of the first loop drive as it travels in that drive is the surface opposite the major surface facing the periphery of the second loop drive as it travels around that drive. In other words, loop drives 212 and 214 are reading/writing opposite sides of strip 24.

Strip 24 is then exited from second loop drive 214 and is transported along the working surface of second circuitous path 210 in a clockwise direction. Strip 24 is then returned to the appropriate shelf 206 in magazine 204.

System 200 is advantageous in that it allows strip 24 to be moved continuously in one direction without the need to reverse the direction of travel of the strip. Another advantage of system 200 is its ability to read/write both sides of strip 24, thereby potentially doubling the storage capacity of each strip, and therefore the system as a whole. The design of system 200 also allows for the presence of numerous strips 24 in recording deck 202, thereby minimizing access times of individual strips. For example, while one strip 24 is traveling from magazine 204 along first circuitous path 208 toward first loop drive 212, a second strip is already in the first loop drive, a third strip is traveling toward second loop drive 214, a fourth strip is already in the second loop drive, and a fifth strip is being returned to the magazine.

Figure 7:
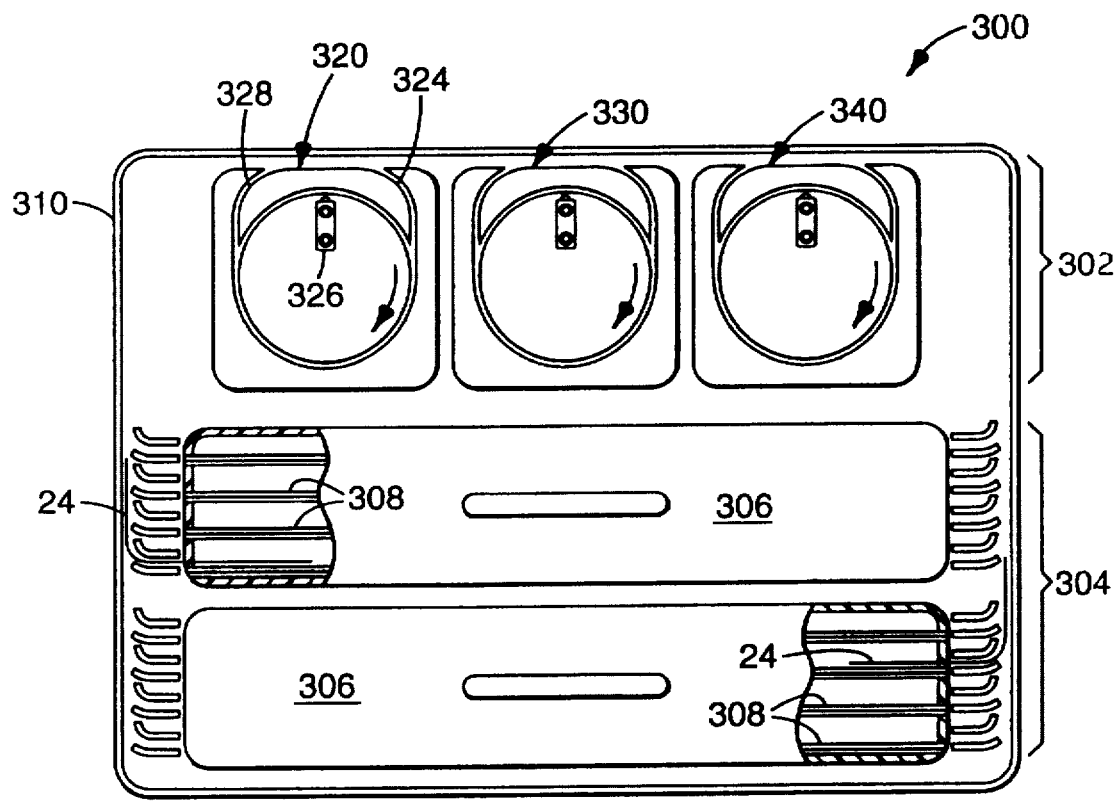

Another embodiment of a mass storage system according to the present invention is shown in FIG. 7. System 300 is comprised of a recording deck 302 and a magazine storage 304. Magazine storage 304 is comprised of a plurality of removable submagazines 306 which each hold a plurality of shelves 308, e.g., eight shelves. Recording deck 302 is comprised of three loop drives 320, 330, and 340, which allow system 300 to simultaneously read/write on three strips 24.

System 300 operates as follows. Strip 24 is transported from a shelf 308 in a submagazine 306 toward loop drives 320, 330, and 340 on the working surface of circuitous path 310. As strip 24 nears first loop drive 320, an air knife or mechanical gate is activated to cause the strip either to bridge the gap and continue on circuitous path 310 toward loop drives 330 and 340, or to enter the first loop drive via drive inlet 324.

Strip 24 then travels around the periphery of first loop drive 320 past transducer 326 as many times as necessary to read/write the strip. Meanwhile, a is second strip 24 may be transported on the working surface of circuitous path 310 past first loop drive 320 and into second loop drive 330. Similarly, a third strip 24 may be transported past the drive gates of the first two loop drives 320 and 330 and into third loop drive 340.

The first strip 24 in the first loop drive 320 may be exited from the drive via drive outlet 328 and returned to the appropriate shelf 308 in the appropriate submagazine 306 via circuitous path 310. The second and third strips 24 may be returned to magazine 304 in the same manner.

System 300 is advantageous because it has three loop drives, thereby increasing the speed with which information can be accessed, and because the submagazines 306 are replaceable, thereby allowing the information base of the system to be modified.

Figure 8:
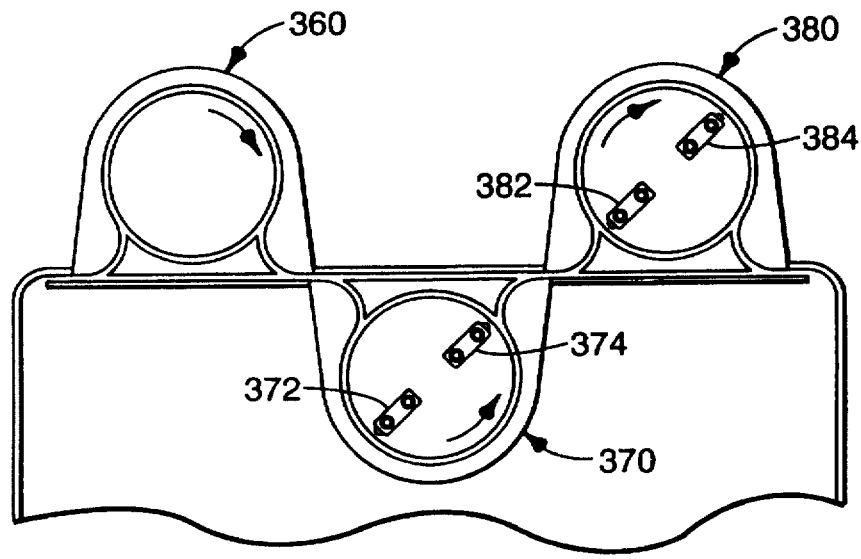

In an alternative embodiment of the present invention, loop drives 320, 330, and 340 in FIG. 7 are replaced by optional accelerating loop 360 and first loop drive 370 and second loop drive 380, as shown in FIG. 8. Optional accelerating loop 360 accelerates strip 24 in a first direction, e.g., clockwise, to reading/writing speed and then directs the strip to loop drives 370 or 380 as a second strip enters the accelerating loop. Strip 24 is transported around loop drive 370 in a direction opposite the direction of transport in accelerating loop 360, i.e., counterclockwise. One side of strip 24 is continuously read/written by transducers 372 and 374 in first loop drive 370 as the strip is transported around the drive in a direction opposite the direction of transport in accelerating loop 360, i.e., counterclockwise. Strip 24 is then directed toward second loop drive 380. Meanwhile, the second strip enters the first loop drive 370 and a third strip enters accelerating loop 360.

Second loop drive 380 reads/writes the opposite side of strip 24 while transporting the strip past transducers 382 and 384 in the direction opposite that of first loop drive 370, and thus the same as accelerating loop 360, i.e., clockwise. The length of the path between transducer 374 in the first loop drive and transducer 382 in the second loop drive is shorter than the length of strip 24.

Because the inner perimeters of loop drives 370 and 380 are each typically about the same length as recording strip 24, the path length between transducers 374 and 382 should be less than the length of the periphery of the loop drives. This allows for continuous reading/writing of strip 24 because second loop drive 380 may begin reading/writing the second side of the strip just before first loop drive 370 has finished reading/writing the first side of the strip. Strip 24 is then exited from the second loop drive 380 and returned to the magazine.

Figure 9:
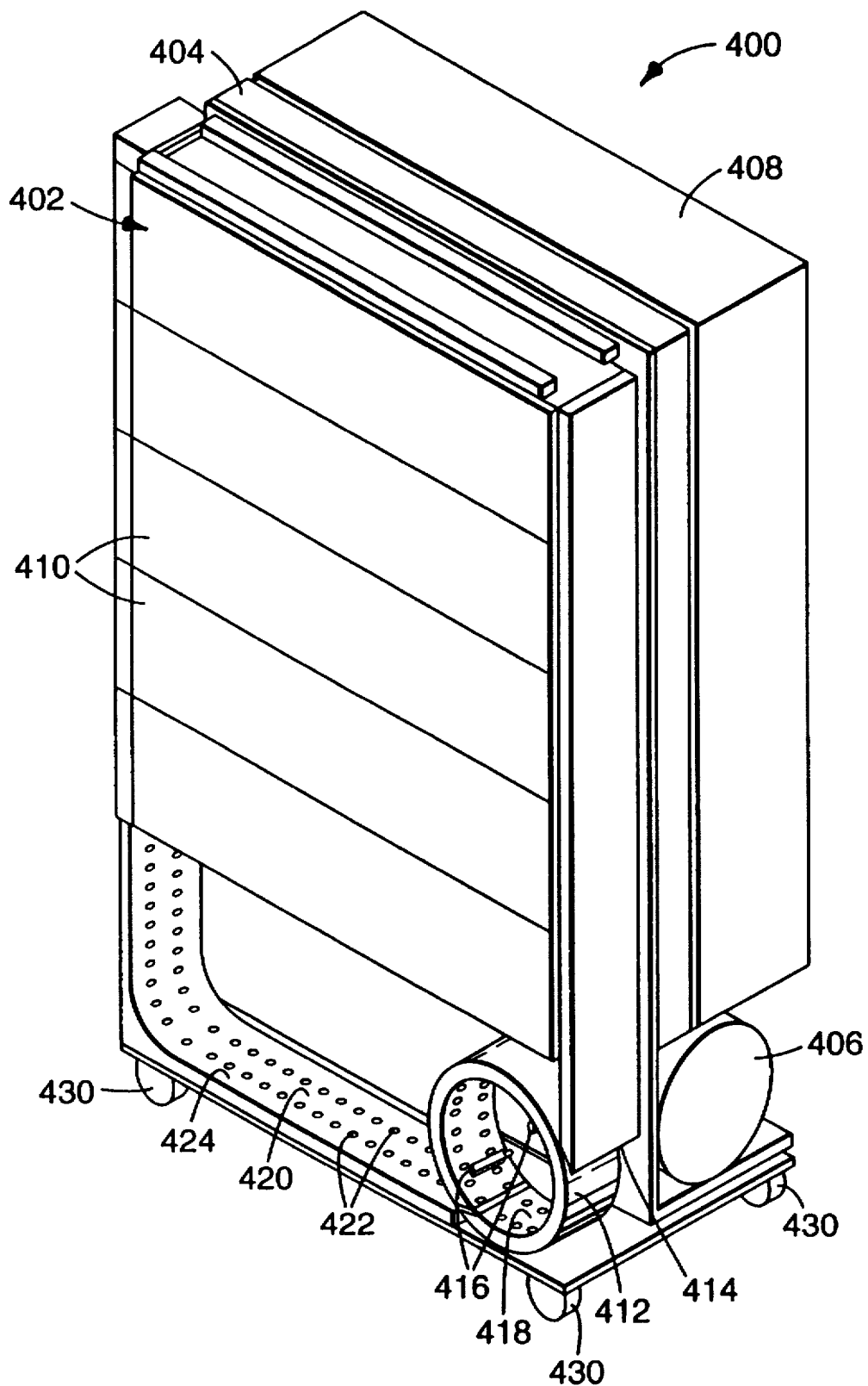
FIG. 9 is a schematic perspective view of a mass storage system according to yet another embodiment of the present invention.

Yet another embodiment of a mass storage system according to the present invention is shown in FIG. 9. System 400 is comprised of a removable magazine 402, air supply network 404, air supply 406, electronics 408, and loop drive 412. Removable magazine 402 is comprised of a plurality of submagazines 410, e.g., five, each of which contains a plurality of shelves (not shown) e.g., 100. A strip 24 (not shown) is transported from removable magazine 402 to loop drive 412 via entry slot 414. The strip 24 is then transported around the periphery of loop drive 412, by jets emanating from orifices in working surface 418, and past transducers 416 as many times as necessary to read/write the strip.

Strip 24 is then exited from loop drive 412 via exit slot 426 and transported along path 424 by air jets emanating from orifices 422 in working surface 420. Strip 24 is then returned via path 424 to the appropriate shelf in magazine 402.

System 400 is advantageous in that magazine 402 is removable. Thus, the storage capacity of system 400 may be increased by replacing one magazine 402 with another magazine storing different strips 24. Furthermore, magazine 402 may be transported to another system 400 in a different location without having to transport the entire system. System 400 is also provided with wheels 430 which facilitate the transportation of the entire system.

Figure 10:
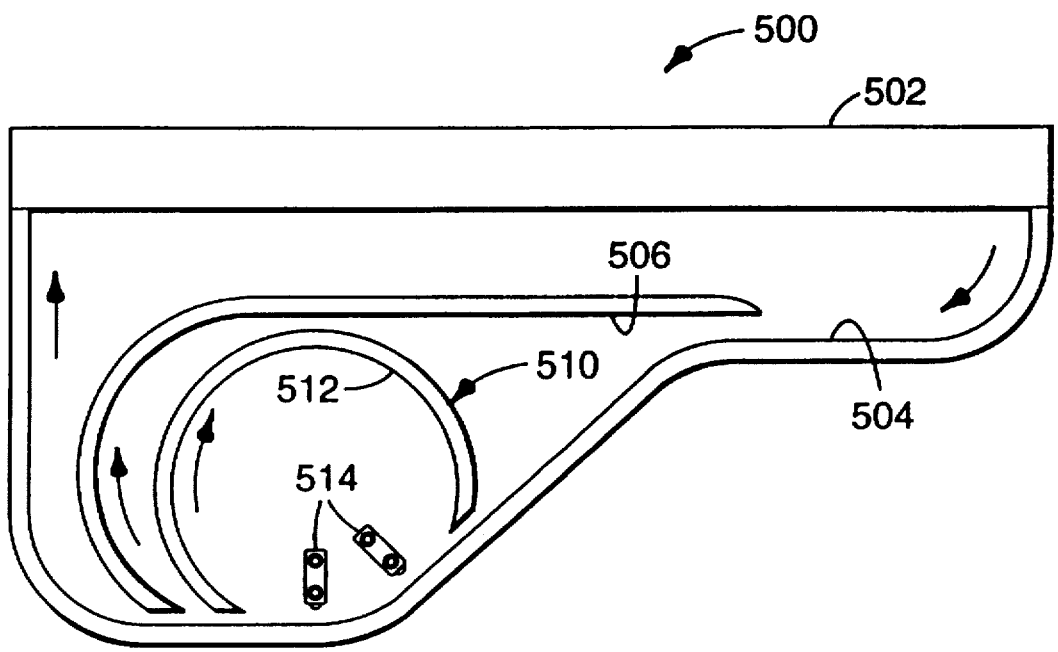
FIGS. 10 and 11 are schematic side views of mass storage systems according to alternative embodiments of the present invention.

Still yet another mass storage system is shown schematically in FIG. 10. System 500 is comprised of magazine 502, first working surface 504, second working surface 506, and loop drive 510. Loop drive 510 is comprised of working surface 512 and transducers 514. Strip 24 is transported from magazine 502 along first working surface 504 and into loop drive 510, where it is transported around the periphery of the loop on working surface 512 in a clockwise direction past transducers 514. Strip 24 is then exited from loop drive 510 and onto second working surface 506 which transports the strip past the loop drive and back onto first working surface 504, where it is transported back along the first working surface until the length of the strip is entirely removed from the second working surface. At this point, the direction of transport of strip 24 is reversed and the strip is transported on first working surface 504 back toward loop drive 510. Thus, second working surface 506 has reversed the surface of strip 24 being read/written by transducers 514.

Strip 24 is then read/written by transducers 514 in loop drive 510 and exited from loop drive 510 onto second working surface 506. Strip 24 is transported to first working surface 504, where its direction of travel is reversed, as described above, thereby reversing the surface of the strip facing the working surface and returning the strip to its original orientation. Strip 24 is then transported on first working surface 504 past loop drive 510 and the entrance to second conduit 506 and is returned to magazine 502.

Figure 11:
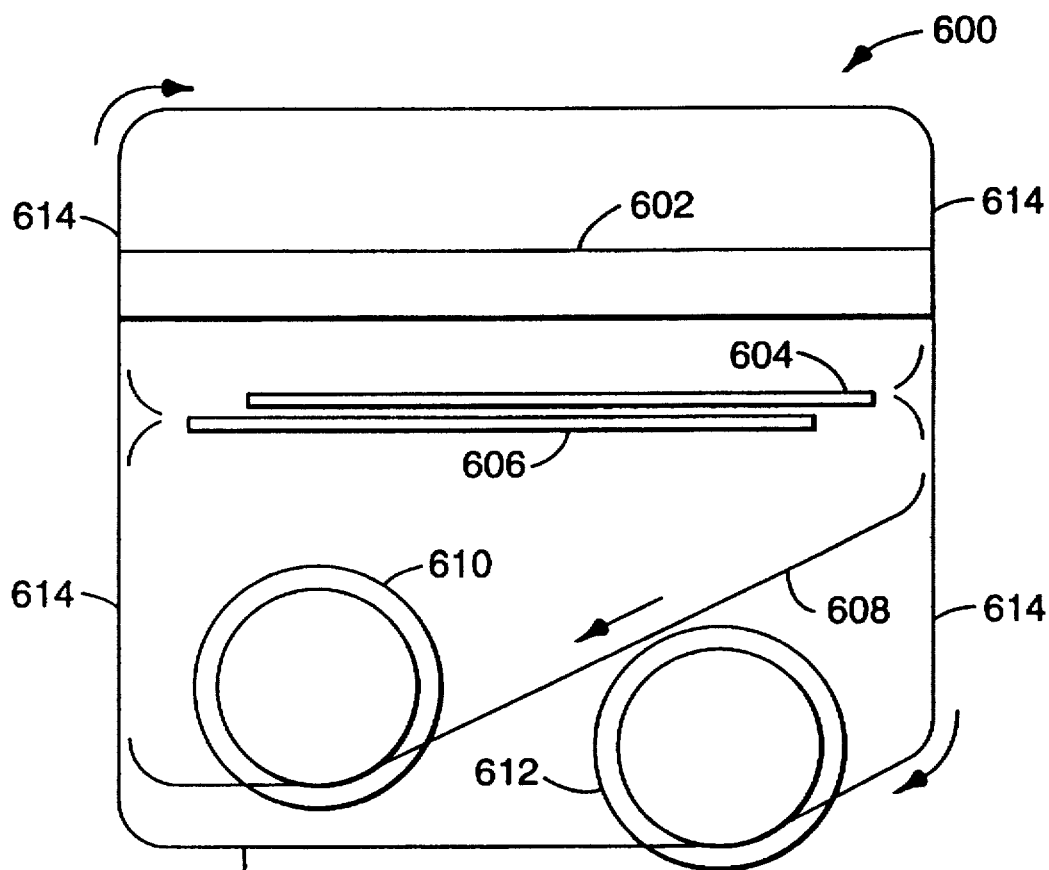

Another mass storage system capable of reading both sides of a recording strip is shown in FIG. 11. System 600 is comprised of magazine 602, first reversing bin 604, second reversing bin 606, circuitous working surface 614, bypassing working surface 608, and loop drives 610 and 612. Strip 24 is transported from magazine 602 along circuitous working surface 614 and past first reversing bin 604. Strip 24 is transported either to loop drive 612, or via bypassing working surface 608 to loop drive 610, depending on which drive is ready to read/write the strip. Strip 24 is then read/written in loop drives 610 and 612 as the strip is moved around the periphery of the loops in a clockwise direction. Strip 24 is then exited from the loop drives and is transported in a clockwise direction along circuitous working surface 614 past second reversing bin 606, past magazine 602, and back around system 600 to first reversing bin 604. Strip 24 enters first reversing bin 604, which is designed to accommodate the length of the strip. Strip 24 is then exited from first reversing bin 604 and proceeds clockwise along circuitous working surface 614 to either loop drive 610 or 612, as described above. This entry and exit of strip 24 into first reversing bin 604 reverses the strip to allow the drives to read/write the opposite side of the strip.

Strip 24 is then read/written by loop drives 610 and 612 in a clockwise direction as described above. Strip 24 is then exited from drives 610 and 612 and transported over circuitous working surface 614 and into second reversing bin 606, which is designed to accommodate the length of the strip. Strip 24 is then exited from second reversing bin 606 and transported along circuitous working surface 614 and returned to magazine 602. Thus, second reversing bin 606 reverses the orientation of the strip back to its original orientation prior to the return of the strip to magazine 602.

System 600 is designed to simultaneously accommodate numerous strips 24. Thus, at a given point in time, a first strip may be in loop drive 610, a second strip may be in loop drive 612, a third strip may be being reversed in first reversing bin 604, and a fourth strip may be being re-reversed in second reversing bin 606.

Returning to FIG. 4, drive 30 can be constructed from various metals, plastics, composites, etc., but can also be made from any material that can be molded into the shape of a loop. The working surface of the drive is preferably made of metal, but can also be made of plastics, composites, etc. The drive preferably has a diameter within the range of from about 1 cm to 2 m. A larger drive would have the capability of employing more transducers and accommodating longer recording strips.

The shape of drive 30 can be circular, as shown in the Figures, or it can be in the shape of an oval having two parallel sides, an ellipse, in the shape of a rectangle having rounded corners, or irregular. However, no curve within the loop should be so sharp that the recording tape cannot be smoothly transported around the loop by the fluid streams.

The orifices 16, 38, and 40 are each preferably provided in two or more arrays, at least one positioned on each side of the centerline of the working surface. The two arrays can be staggered with respect to each other. The orifices can be rectangular or elliptical and have dimensions of about 1 mm wide by 5 mm long, and can be oriented outwardly or linearly along the direction of travel of the recording strip at an angle a of about 30 degrees with respect to the centerline.

Recording strip 24 is preferably any sheet which is capable of storing information which can be retrieved by magnetic or optical means. The recording strip preferably has a recording surface similar to high performance video/data magnetic recording tape such as S-VHS. The tape may be capable of storing information on either one or both of its sides. The strip preferably has a length within the range of from about 12 cm to 5 m and a width within the range of from about 1.25 cm to 20 cm. The strip should be about as long as the inner periphery of the loop-shaped conduit with which it is intended to be used in order to minimize access times, but the strip can also be longer or shorter than the inner periphery. The strip will typically have a weight per unit area of about 3 mg/cm$^2$.

The storage capacity of magazine storage system 20 can be designed to suit various needs. For example, with recording strips of width 2.54 cm and length 25.4 cm placed in a 30 cm tall magazine having a shelf density of 5 shelves per centimeter, 150 strips of tape could be stored. If each strip had a recording capacity of 2 Megabytes, the total capacity of the system would be 300 Megabytes. Use of double-sided recording strips would double that capacity to 600 Megabytes. The storage capacity can be further increased by decreasing the spacing between shelves, increasing the height of the magazine, increasing the size and/or capacity of each recording strip, or increasing the number of magazines. Access times of less than one second can be achieved.

Although working surface 36 is shown on the inner periphery of loop-shaped conduit 34, it may instead be provided on the outer periphery. Strip 24 will still be held closely to the working surface, although this may be increasingly difficult to do at high speeds. Multiple working surfaces can also be used to provide special functions such as changing the direction of travel of the strip, bridging gaps, and braking.

The transducer(s) can be provided on the side of the strip opposite the working surface, or can be provided behind, within, or protruding from the working surface. A second working surface could also be positioned on the opposite side of the strip from the first working surface, with the transducer(s) being provided within the second working surface.

It will be obvious to those skilled in the art that having a device such as the one disclosed herein that can precisely read and write information on a strip and which leaves one surface of the strip exposed can have applications in imaging, photography, x-ray, and other display or image gathering devices. Although the invention has been described for use with flexible recording strips, the invention can be used with any flexible strip of material that has properties which can be sensed by a transducer.

We claim:

1. A magazine storage system for recording strips, comprising:

a loop-shaped drive comprising a first loop-shaped conduit having an inner periphery and an outer periphery, the first conduit having a first continuous working surface on an exterior surface of one of the peripheries, the first working surface having a first plurality of orifices for directing fluid, supplied to the first conduit, to support and transport the strip around said one of the peripheries in at least a first direction and into close proximity with at least one transducer;

a magazine comprising a plurality of shelves for storing recording strips thereon;

a second conduit having a second continuous working surface, the second working surface having a second plurality of orifices for directing fluid, supplied to the second conduit, to support a recording strip and transport it from the magazine to the drive, wherein the orifices are provided on both sides of a longitudinal centerline along a direction of travel of the strip;

a third conduit having a third continuous working surface, the third working surface having a third plurality of orifices for directing fluid, supplied to the third conduit, to support a recording strip and transport it from the drive to the magazine, wherein the orifices are provided on both sides of a longitudinal centerline along a direction of travel of the strip; and a cusp for facilitating transport of a recording strip from the shelves to the second working surface, wherein the cusp can be moved among the shelves, whereby any desired recording strip in the magazine may be accessed, and wherein the recording strip is transported, by fluid streams originating from the shelves, from the shelves via the cusp to the second working surface.

2. The system of claim 1, further comprising:

a second magazine having a second plurality of shelves for storing recording strips thereon;

a fourth conduit having a fourth continuous working surface, the fourth working surface having a fourth plurality of orifices for directing fluid, supplied to the fourth conduit, to support a recording strip and transport it from the second magazine to the drive; and a fifth conduit having a fifth continuous working surface, the fifth working surface having a fifth plurality of orifices for directing fluid, supplied to the fifth conduit, to support a recording strip and transport it from the drive back to the magazine.

3. The system of claim 2, further comprising means for laterally shifting a recording strip on the fourth working surface into alignment with the drive.

4. The system of claim 1, wherein the drive reads/writes a first side of a recording strip as it passes the transducer in a first direction, and further comprising:

a second loop-shaped drive comprising a fourth conduit which is loop-shaped and has an inner periphery and an outer periphery, the fourth conduit having a fourth continuous working surface on an exterior surface of one of the peripheries, the fourth working surface having a fourth plurality of orifices for directing fluid, supplied to the fourth conduit, to support and transport the strip around said one of the peripheries in at least a first direction and into close proximity with a second transducer, wherein the second drive is capable of reading/writing a second side opposite the first side of the recording strip as it passes the second transducer in a second direction opposite the first direction; and a fifth conduit having a fifth working surface, the fifth continuous working surface having a fifth plurality of orifices for directing fluid, supplied to the fifth conduit, to support the recording strip and transport it from the first drive to the second drive, whereby the system is capable of reading/writing both sides of a recording strip.

5. The system of claim 1, wherein the magazine is removable from the system.

6. The system of claim 1, wherein the magazine is comprised of a plurality of submagazines, each of which comprises a plurality of shelves for storing recording strips thereon, and wherein the submagazines are removable from the system.

7. The system of claim 1, wherein the drive reads/writes a first recording strip as it passes the transducer in a first direction, further comprising a second loop-shaped drive comprising a fourth conduit which is loop-shaped and has an inner periphery and an outer periphery, the fourth conduit having a fourth continuous working surface on an exterior surface of one of the peripheries, the fourth working Surface having a fourth plurality of orifices for directing fluid, supplied to the fourth conduit, to support and transport the strip around said one of the peripheries in at least a first direction and into close proximity with a second transducer wherein the second drive is capable of reading/writing the second recording strip as it passes the second transducer in the first direction, whereby the system is capable of simultaneously reading/writing two recording strips.

8. The system of claim 1, wherein the strip has first and second major surfaces, wherein the loop-shaped drive is a first loop-shaped drive that comprises first and second transducers and transports the strip around the first loop-shaped drive in a first direction, and wherein the first and second transducers read/write the first major surface of the strip, and further comprising a second loop-shaped drive comprising a fourth conduit which is loop-shaped and has an inner periphery and an outer periphery, the fourth conduit having a fourth continuous working surface on an exterior surface of one of the peripheries, the fourth working surface having a fourth plurality of orifices for directing fluid, supplied to the fourth conduit, to support and transport the strip around said one of the peripheries in at least a second direction opposite the first direction, and close proximity with a second transducer, having third and fourth transducers, wherein the second and third transducers read/write the second major surface of the strip.

9. The system of claim 8, wherein the length of path travelled by the strip between the second and third transducers is less than the length of said one of the peripheries of the first loop-shaped drive, whereby the second and third transducers may read/write on the two major surfaces of the strip simultaneously.

10. The system of claim 9, further including an accelerating loop for accelerating the strip to reading/writing speed prior to entry into the first loop-shaped drive.

11. The system of claim 1, wherein the strip has first and second major surfaces, and wherein the strip may be entered onto the first working surface on one of said peripheries, on a first side of the drive, and wherein the drive may read/write on the first major surface of the strip, and further comprising a fourth conduit having a fourth working surface, the fourth working surface having a plurality of orifices for directing fluid, supplied to the fourth conduit, to support a recording strip and transport it from the second conduit, past the drive, and back to the second conduit, thereby reversing the orientation of the strip, so that the drive may read/write on the second major surface of the strip, whereby the system is capable of reading/writing both surfaces of the strip.

12. The system of claim 1, wherein the strip has first and second major surfaces, and wherein the first major surface of the strip faces the second conduit, and further comprising means for transporting the strip from the second conduit into a reversing bin, stopping the strip, reversing the direction of travel of the strip, exiting the reversing bin, and replacing the strip on the second conduit, wherein the second major surface of the strip faces the second conduit, whereby the system may read/write both surfaces of the strip.

13. A magazine storage system for reading/writing both sides of a recording strip comprising:

a first loop-shaped drive comprising a first loop-shaped conduit having an inner periphery and an outer periphery, the first conduit having a first continuous working surface on an exterior surface of one of the peripheries, the first working surface having a first plurality of orifices for directing fluid, supplied to the first conduit, to support and transport the strip around said one of the peripheries in at least a first direction and into close proximity with at least one transducer, and wherein the strip has first and second major surfaces, whereby the first major surface of the strip may be read/written by the first drive;

a second loop-shaped drive comprising a second conduit which is loop-shaped and has an inner periphery and an outer periphery, the second conduit having a second continuous working surface on an exterior surface of one of the peripheries, the second working surface having a second plurality of orifices for directing fluid, supplied to the second conduit, to support and transport the strip around said one of the peripheries in at least a first direction and into close proximity with a second transducer, whereby the second major surface of the strip may be read/written by the second drive;

a magazine comprising a plurality of shelves for storing recording strips thereon;

a third conduit having a third working surface having a third plurality of orifices for directing fluid, supplied to the third conduit, to support a recording strip and transport it between the magazine and the drives;

means for manipulating a recording strip so that the first drive may read/write the first major surface of the strip and the second drive may read/write the second major surface of the strip, whereby the system may read/write both surfaces of the strip; and a cusp for facilitating transport of a recording strip from the shelves to the third working surface, wherein the cusp can be moved among the shelves, whereby any desired recording strip in the magazine may be accessed, and wherein the recording strip is transported, by fluid streams originating from the shelves, from the shelves via the cusp to the third working surface.

14. The system of claim 12, wherein the first drive transports the strip around said one of the peripheries of the first drive past the first transducer in a first direction, and wherein the second drive transports the strip around said one of the peripheries of the second drive past the second transducer in a second direction, wherein the second direction is opposite the first direction.

15. The system of claim 14, wherein the length of path travelled by the strip between the first and second transducers is less than the length of said one of the peripheries of either drive.

16. The system of claim 15, further comprising an accelerating loop for accelerating the strip to reading/writing speed.

17. The system of claim 12, wherein the first drive transports the strip around said one of the peripheries of the first drive past the first transducer in a first direction, and wherein the second drive transports the strip around said one of the peripheries of the second drive in a second direction, wherein the second direction is the same as the first direction.

18. The system of claim 7, wherein the manipulating means further comprises means for removing the strip from the third working surface, stopping the strip, reversing the direction of travel of the strip, and replacing the strip on the third conduit, whereby the major surface that faces the third conduit is switched.

19. A magazine storage system for recording strips, comprising:

a loop-shaped drive comprising a first loop-shaped conduit having an inner periphery and an outer periphery, the first conduit having a first continuous working surface on an exterior surface of one of the peripheries, the first working surface having a first plurality of orifices for directing fluid, supplied to the first conduit, to support and transport the strip around said one of the peripheries in at least a first direction and into close proximity with at least one transducer;

a magazine comprising a plurality of shelves for storing recording strips thereon;

a second conduit having a second continuous working surface that is non-enclosed, the second working surface having a second plurality of orifices for directing fluid, supplied to the second conduit, to support a recording strip and transport it from the magazine to the drive; and a third conduit having a third continuous working surface that is non-enclosed, the third working surface having a third plurality of orifices for directing fluid, supplied to the third conduit, to support a recording strip and transport it from the drive to the magazine; and a cusp for facilitating transport of a recording strip from the shelves to the second working surface, wherein, the cusp can be moved among the shelves, whereby any desired recording strip in the magazine may be accessed, and wherein the recording strip is transported, by fluid streams originating from the shelves, from the shelves via the cusp to the second working surface.

* * * * *

UNITED STATES PATENT AND TRADEMARK OFFICE
CERTIFICATE OF CORRECTION

PATENT NO.: 5,485,325

DATED: January 16, 1996

INVENTOR(S): Skow et al.

It is certified that error appears in the above-identified patent and that said Letters Patent is hereby corrected as shown below:

Title page, column 2, under OTHER PUBLICATIONS, second reference cited, "Lift Transport" should read --Air Lift Transport--.

In column 1, line 55, "runnel" should read --tunnel--. In column 1, line 58, "tact" should read --fact--.

In column 3, line 42, "Alter" should read --"After--.

In column 3, line 54, "tan" should read --fan--.

In column 8, line 11, delete "is".

In column 12, line 50, "working Surface" should read --working surface--.

In column 12, line 54, "transducer" should read --transducer,--.

In column 14, line 18, "12" should read --13--.

In column 14, line 32, "12" should read --13--.

In column 14, line 39, "7" should read --17--.

UNITED STATES PATENT AND TRADEMARK OFFICE
CERTIFICATE OF CORRECTION

PATENT NO. : 5,485,325
DATED : January 16, 1996
INVENTOR(S) : Skow et al.

It is certified that error appears in the above-indentified patent and that said Letters Patent is hereby corrected as shown below:

In column 15, "wherein, the" should read —wherein the—.

Signed and Sealed this

Twenty-seventh Day of August, 1996

*Attest:*

BRUCE LEHMAN

*Attesting Officer*     *Commissioner of Patents and Trademarks*